US007958602B2

(12) United States Patent
Nishizawa et al.

(10) Patent No.: US 7,958,602 B2
(45) Date of Patent: Jun. 14, 2011

(54) HINGE MECHANISM

(75) Inventors: Katsuhito Nishizawa, Ichikawa (JP);
Satoshi Mochizuki, Ichikawa (JP);
Hitoshi Sato, Ichikawa (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 59 days.

(21) Appl. No.: 12/513,664

(22) PCT Filed: Nov. 2, 2007

(86) PCT No.: PCT/JP2007/071397
§ 371 (c)(1),
(2), (4) Date: May 5, 2009

(87) PCT Pub. No.: WO2008/056607
PCT Pub. Date: May 15, 2008

(65) Prior Publication Data
US 2010/0077566 A1    Apr. 1, 2010

(30) Foreign Application Priority Data
Nov. 6, 2006   (JP) .................................. 2006-300474

(51) Int. Cl.
*E05D 3/10* (2006.01)
(52) U.S. Cl. ........................................................ 16/367
(58) Field of Classification Search ............. 26/367,
26/287, 221; 361/679.07, 679.06; 379/433.13
See application file for complete search history.

(56) References Cited

U.S. PATENT DOCUMENTS
7,657,027 B2 *  2/2010  Kim et al. ................ 379/433.13
(Continued)

FOREIGN PATENT DOCUMENTS

| JP | 3496445 | 11/2003 |
|---|---|---|
| JP | 2005-133759 | 5/2005 |
| JP | 2005-286425 | 10/2005 |
| JP | 2006-010025 | 1/2006 |
| JP | 2006-161971 | 6/2006 |
| JP | 2006-233998 | 9/2006 |
| JP | 2006-242220 | 9/2006 |
| JP | 2007-113686 | 5/2007 |

OTHER PUBLICATIONS

International Search Report dated Feb. 5, 2008.

*Primary Examiner* — David J Bagnell
*Assistant Examiner* — Matthew Sullivan
(74) *Attorney, Agent, or Firm* — Knobbe Martens Olson & Bear LLP

(57) ABSTRACT

A hinge mechanism in which two housings are respectively connected to a first rotation shaft and a second rotation shaft that are arranged perpendicular to each other and the housing are arbitrarily openable about either one of the shafts is provided. In the hinge mechanism 1, at an end of a rotation shaft holding section (4) of a hinge housing (1), an end of an opening and closing shaft holding section (5) is integrated together in a state of being perpendicular to each other, the rotation shaft holding section (4) being formed in it a tubular shaft hole for supporting a rotation shaft section (3), and the opening and closing shaft holding section (5) being formed in it a tubular shaft hole for supporting an opening and closing shaft section (2), and the hinge housing (1) is substantially L-shaped as a whole. When the opening and closing shaft (2) is rotated, an opening and closing limiting outer peripheral surface enters an escape recess to cause a restraining end section to be restrained by the opening and closing limiting outer peripheral surface, and as a result, rotation of the rotation shaft section (3) is restrained. When the rotation shaft section (3) is rotated, a rotation limiting outer peripheral surface of the rotation shaft section (3) enters a portion of a restraining end surface to cause rotation of the opening and closing shaft (2) to be restrained.

9 Claims, 10 Drawing Sheets

U.S. PATENT DOCUMENTS

| | | | |
|---|---|---|---|
| 7,697,964 B2 * | 4/2010 | Hwang | 455/575.3 |
| 7,707,690 B2 * | 5/2010 | Lowry et al. | 16/367 |
| 2006/0064850 A1 | 3/2006 | Sato et al. | |
| 2006/0185123 A1 * | 8/2006 | Kuramochi | 16/221 |
| 2007/0123319 A1 * | 5/2007 | Hwang | 455/575.1 |
| 2007/0169315 A1 * | 7/2007 | Lu et al. | 16/367 |
| 2007/0169316 A1 * | 7/2007 | Lu et al. | 16/367 |
| 2008/0034547 A1 * | 2/2008 | Hsu | 16/367 |
| 2008/0078062 A1 * | 4/2008 | Hsu et al. | 16/367 |
| 2009/0070963 A1 * | 3/2009 | Lee | 16/367 |
| 2010/0154169 A1 * | 6/2010 | Chen et al. | 16/277 |

* cited by examiner

HINGE MECHANISM

This application is U.S. National Phase under 35 U.S.C. §371 of International Application PCT/JP2007/071397, filed Nov. 2, 2007, which claims priority to Japanese Patent Application No. 2006-300474, filed Nov. 6, 2006. The International Application was published under PCT Article 21(2) in a language other than English.

TECHNICAL FIELD

This invention relates to a hinge mechanism in a small electronic device with two housings, meaning a portable telephone, a notebook computer, an electronic organizer, a DVD monitor, a remote controller or a game unit, or the like. The hinge mechanism connects the two housings and attains two states of opening with limit of movement in which it is turned about only one shaft selected from a first shaft and a second shaft, which are arranged perpendicular to each other.

BACKGROUND ART

Commonly, video cameras are marketed that are provided with a monitor screen section in the form of a housing separate from a video camera main body (which is hereinafter referred to as a VTR section). In such a video camera, a structure is formed in which the VTR section and the monitor screen section are connected by a two-shaft hinge device. Firstly, the monitor screen section is turned horizontally relative to the VTR section, about a first rotation shaft of the two-shaft hinge device, and opened out to a position orthogonal to the VTR section. Then, in this opened state, the monitor screen section is turnable about a second rotation shaft of the two-shaft hinge device.

In a video camera provided with this kind of two-shaft hinge device, if the two rotation shafts of the two-shaft hinge device are rotated simultaneously, corner portions of the housing of the VTR section and the housing of the monitor screen section collide, and there is a possibility that either of the housings will be damaged.

Accordingly, in this kind of video camera, the VTR section and the monitor screen section are constituted with a two-shaft hinge device with a rotation-limiting function. Thus, turning of the monitor screen section is enabled when the monitor screen section has first been opened to be orthogonal to the VTR section, and it is possible to prevent the VTR section and the monitor screen section from colliding and causing damage.

Thus, the following structure has been proposed as a structure of a conventional two-shaft hinge device with a rotation-limiting function.

A recess section at which a portion of a shaft section is cut away is formed at each of a first rotation shaft and a second rotation shaft. The first rotation shaft and the second rotation shaft are made perpendicular at the positions of the recess sections, and the perpendicular portion is rotatably supported by a retention member. Here, a distance at the perpendicular position between an axis of the first rotation shaft and an axis of the second rotation shaft is set to a distance such that; in a position at which the recess section of the first rotation shaft is opposed with the second rotation shaft, the second rotation shaft is rotatable, but when the recess section of the second rotation shaft opposes, at the position opposing the first rotation shaft, a portion other than the recess section of the first rotation shaft, an end portion of the recess section of the second rotation shaft touches against the first rotation shaft and is non-rotatable.

Furthermore, the distance is set such that, in a position at which the recess section of the second rotation shaft is opposed with the first rotation shaft, the first rotation shaft is rotatable, but when the recess section of the first rotation shaft opposes, at the position opposing the second rotation shaft, a portion other than the recess section of the second rotation shaft, an end portion of the recess section of the first rotation shaft touches against the second rotation shaft and is non-rotatable.

Thus, it is not possible to simultaneously rotate both the first rotation shaft and the second rotation shaft (see, for example, Patent Reference 1).

As described above, in a two-shaft hinge device with a rotation-limiting function that is employed in a conventional video camera, it is necessary to cut away and form recess sections in each of a shaft radial portion at the middle of the first rotation shaft and a shaft radial portion at the middle of the second rotation shaft. Therefore, it is difficult to reduce the length in the shaft direction of either of the first rotation shaft and the second rotation shaft. Moreover, to increase a distance between the first rotation shaft and the second rotation shaft, it is necessary to increase either of the shaft diameter of the first rotation shaft and the shaft diameter of the second rotation shaft.

Given this, it is difficult to reduce the size of the conventional two-shaft hinge device with the rotation-limiting function.

Meanwhile, in a portable telephone device of a type that folds in two, push buttons are disposed at a first housing and a liquid crystal monitor that displays images is incorporated at a second housing, and a reduction in size of a two-shaft hinge device with a rotation-limiting function that connects the first housing with the second housing is desired.

Furthermore, for recent double-folding type portable telephone devices, it is desired that it should be possible, with a single hinge device, to open out the first housing at which push buttons are disposed and the second housing in which a liquid crystal monitor that displays images is incorporated in two directions; for example, an opening direction in which the second housing is turned about a first rotation shaft and arranged in a longitudinal direction of the first housing, and an opening direction in which the second housing is turned about a second rotation shaft and arranged in a lateral direction of the first housing.

However, if the two-shaft hinge device with a rotation-limiting function that is employed in conventional video cameras is employed as is, from a state in which the monitor screen section is closed, opening in the longitudinal direction that is turned about the first rotation shaft is possible but turning about the second rotation shaft to open in the lateral direction is not possible.

Patent Reference 1: Japanese Patent No. 3,496,445

DISCLOSURE OF INVENTION

Problem to be Solved by the Invention

In view of the points described above, an object of the present invention is to provide a hinge mechanism that connects two housings with a perpendicularly arranged first rotation shaft and second rotation shaft, and is openable in either direction that is selected.

Means for Solving the Problem

An invention recited in claim 1 includes: a movement limiting opening and closing shaft member that is attached to one housing and at an end portion of which an opening and closing limiting protrusion section is provided; a movement limiting rotation shaft member that is attached to another housing and at an end portion of which a rotation limiting protrusion section is provided; a hinge housing that is provided with an opening and closing shaft holding section that rotatably supports the movement limiting opening and closing shaft member, and a rotation shaft holding section that is arranged perpendicular to the opening and closing shaft holding section, rotatably supports the movement limiting rotation shaft member with being perpendicular to the movement limiting opening and closing shaft member, and causes the rotation limiting protrusion section to oppose the opening and closing limiting protrusion section to be capable of direct contacting; an opening and closing limiting outer peripheral surface portion having a circular arc shape that is formed at the opening and closing limiting protrusion section; a restraining end surface which is a portion of the outer peripheral surface portion that is cut away in a planar shape; a rotation limiting outer peripheral surface portion having a circular arc shape that is formed at the rotation limiting protrusion section; and a restraining end section which is a portion of the rotation limiting outer peripheral surface portion that is cut away to form a step, wherein, in a state in which the restraining end surface and the restraining end section are opposed, the movement limiting opening and closing shaft member and the movement limiting rotation shaft member are rotatable, and a spacing between the opening and closing shaft holding section and the rotation shaft holding section is set such that, in a state in which the rotation limiting outer peripheral surface portion opposes the restraining end surface, the restraining end surface touches against the rotation limiting outer peripheral surface portion and rotation of the movement limiting opening and closing shaft member is restrained, and in a state in which the opening and closing limiting outer peripheral surface portion opposes the restraining end section, the restraining end section touches against the opening and closing limiting outer peripheral surface portion and rotation of the movement limiting rotation shaft member is restrained.

In the invention recited in claim 1, in the state in which the restraining end surface of the opening and closing limiting protrusion section provided at the movement limiting opening and closing shaft member and the restraining end section of the rotation limiting protrusion section provided at the movement limiting rotation shaft member are opposing, the movement limiting opening and closing shaft member and the movement limiting rotation shaft member are rotatable.

Thus, from a state in which the one housing and the other housing are closed, the one housing is openable by rotation around the movement limiting opening and closing shaft member and the movement limiting rotation shaft member. Therefore, it is possible to laterally open and longitudinally open the one housing.

Further, in the state in which the restraining end surface of the opening and closing limiting protrusion section and the rotation limiting outer peripheral surface portion of the rotation limiting protrusion section are opposing, the restraining end surface touches against the rotation limiting outer peripheral surface portion and rotation of the movement limiting opening and closing shaft member is restrained. Consequently, when the one housing is laterally opened, opening around the movement limiting opening and closing shaft member is not possible. Therefore, the other housing will not collide with the one housing.

Further yet, in the state in which the opening and closing limiting outer peripheral surface portion opposes the restraining end section, the restraining end section touches against the opening and closing limiting outer peripheral surface portion and rotation of the movement limiting rotation shaft member is restrained.

Consequently, when the one housing is longitudinally opened, opening around the movement limiting rotation shaft member is not possible. Therefore, the other housing will not collide with the one housing.

In an invention recited in claim 2, a length in a shaft direction of the opening and closing limiting protrusion section is set to approximately half of a length in a shaft direction of the rotation limiting protrusion section.

In the invention recited in claim 2, because the shaft direction length of the opening and closing limiting protrusion portion is set to approximately half of the shaft direction length of the rotation limiting protrusion portion, a reduction in size is possible, and a design of the hinge mechanism as a whole may be improved.

An invention recited in claim 3 includes: a lock protrusion section that is provided at the movement limiting opening and closing shaft member; and a restraining surface that is formed at the opening and closing shaft holding section and that, when the movement limiting opening and closing shaft member is rotated beyond restraint by the restraining end section and the opening and closing limiting outer peripheral surface portion, touches against the lock protrusion section to limit a rotation range of the movement limiting opening and closing shaft member.

In the invention recited in claim 3, when the movement limiting opening and closing shaft member rotates beyond restraint by the restraining end section and the opening and closing limiting outer peripheral surface portion, the lock protrusion section touches against the restraining surface and the range of rotation of the movement limiting opening and closing shaft member is limited. Therefore, the housing will not be opened by more than a predetermined angle.

An invention recited in claim 4 includes: a lock protrusion section that is provided at the movement limiting rotation shaft member; and a restraining surface that is formed at the rotation shaft holding section and that, when the movement limiting rotation shaft member is rotated beyond restraint by the restraining end surface and the rotation limiting outer peripheral surface portion, touches against the lock protrusion section to limit a rotation range of the movement limiting rotation shaft member.

In the invention recited in claim 4, when the movement limiting rotation shaft member rotates beyond restraint by the restraining end surface and the rotation limiting outer peripheral surface portion, the lock protrusion section touches against the restraining surface and the range of rotation of the movement limiting rotation shaft member is limited. Therefore, the housing will not be opened by more than a predetermined angle.

In an invention recited in claim 5, an attachment member that is fixed to the one housing is connected to a holder member that is fixed to the movement limiting opening and closing shaft member.

In the invention recited in claim 5, the movement limiting opening and closing shaft member is just attached to the attachment member of the one housing via the holder member. Therefore, assembly may be simplified.

In an invention recited in claim 6, the movement limiting rotation shaft member is connected to an attachment member that is disposed at the other housing.

In the invention recited in claim 6, the movement limiting rotation shaft member is just attached to the attachment member disposed at the other housing. Therefore, assembly may be simplified.

EFFECT OF THE INVENTION

According to the hinge mechanism of the present invention, two housings are connected with a perpendicularly arranged first rotation shaft and second rotation shaft, and may be opened out about either shaft that is selected.

BEST MODE FOR CARRYING OUT THE INVENTION

Herebelow, the hinge mechanism of the present invention will be described while referring to FIG. 1 to FIG. 10.

FIG. 1 to FIG. 4 are overall perspective views of the hinge mechanism. Reference numeral 1 is a hinge housing, and an opening and closing shaft section 2 and a rotation shaft section 3 are both installed, such that central rotation axes thereof are arranged in a state of intersecting each other (here, a perpendicular state), to structure the hinge mechanism.

As shown in FIG. 9 and FIG. 10, the hinge housing 1 of this hinge mechanism is constituted of a metal material such that an end portion of the opening and closing shaft section 2 and an end portion of the rotation shaft section 3 may be caused to intersect at right angles (a constitution such that they intersect at an angle other than a right angle is also possible), face each other and be rotatably supported.

Thus, the hinge housing 1 as a whole is structured in a substantial L shape, with a rotation shaft holding section 4, in which a tubular shaft hole for supporting the rotation shaft section 3 is formed, and an end portion of an opening and closing shaft holding section 5, in which a tubular shaft hole for supporting the opening and closing shaft section 2 is formed, being integrated in a state in which the end portion of the opening and closing shaft holding section 5 is perpendicular with an end portion of the rotation shaft holding section 4.

That is, an axis of the rotation shaft section 3, which is inserted to inside the shaft hole of the rotation shaft holding section 4 and supported, and an axis of the opening and closing shaft section 2, which is inserted to inside the shaft hole of the opening and closing shaft holding section 5 and supported, are perpendicular in plan view.

Here, at the position at which the rotation shaft holding section 4 and the opening and closing shaft holding section 5 are perpendicular, tubular portions of each are cut away, the cutaway portions are superposed with one another, and a perpendicular portion is formed.

Thus, a height of the hinge housing 1 at the position at which the axis of the rotation shaft section 3 and the axis of the opening and closing shaft section 2 are perpendicular is about half of a height if the respective external dimensions were added together without the cutaway portions being formed, and a reduction in size is enabled.

If an amount of the reduction in size is converted to volume, when the respective tubular portions are cut away and the cutaway portions are superposed, the reduction in volume corresponds to about a quarter of an overall volume of the hinge housing 1 compared to a case in which the external dimensions of the rotation shaft holding section 4 and the opening and closing shaft holding section 5 are made perpendicular as is without the cutaway portions being formed.

Further, restraining surfaces 6 are formed at a distal end portion of the opening and closing shaft holding section 5. Thus, a corner portion of the opening and closing shaft holding section 5 simply protruding may be avoided.

Restraining surfaces 6 and 7 for limiting a rotation range of the opening and closing shaft section 2 are formed at opening portions at the both ends of the shaft hole of the opening and closing shaft holding section 5. Further, a sliding support surface section 8 that supports the opening and closing shaft section 2 rotatably in the shaft direction is formed inside the shaft hole of the opening and closing shaft holding section 5.

A recess section 111 that supports a first rotation movement range limiting small head section 49 is formed at the position at which the center line of the rotation shaft holding section 4 and the center line of the opening and closing shaft holding section 5 are perpendicular. At a floor surface of the recess section 111, an opening portion 9 is formed such that the small head section 49 and a second rotation movement range limiting head section 31 are opposed to be capable of direct contact.

At the hinge housing 1, restraining surfaces 10 and 11 for limiting a rotation range of the rotation shaft section 3 are formed at opening portions at the both ends of the shaft hole of the rotation shaft holding section 4. Further, although not illustrated, similarly to the sliding support surface section 8 of the opening and closing shaft holding section 5, a sliding support surface section for supporting the rotation shaft section 3 rotatably in the shaft direction is formed inside the shaft hole of the rotation shaft holding section 4.

As shown in FIG. 9, the rotation shaft section 3 attached in the rotation shaft holding section 4 of the hinge housing 1 has a structure that is equipped, at a movement limiting rotation shaft member 12, with a first sliding plate 13, a second sliding plate 15, a first compression coil spring 16, a first fixed cam 17, a first rotating cam 18, a first fixed plate 19, a first holder member 20 and a first lock plate 33.

As shown in FIG. 10, the opening and closing shaft section 2 attached in the opening and closing shaft holding section 5 of the hinge housing 1 has a structure that is equipped, at a movement limiting opening and closing shaft member 21, with a third sliding plate 22, a fourth sliding plate 24, a second compression coil spring 25, a second fixed cam 26, a second rotating cam 27, a second fixed plate 28, a second holder member 29 and a second lock plate 34.

As shown in FIG. 9, at the movement limiting rotation shaft member 12, the second rotation movement range limiting head section 31 is integrally formed at a distal end portion of the shaft member that has an oval cross-section.

The second rotation movement range limiting head section 31 of the movement limiting rotation shaft member 12 includes a second limiting outer peripheral surface portion 31A formed in a circular rod shape, an escape recess section 32A at which a predetermined portion of the second limiting outer peripheral surface portion 31A is cut along a direction parallel to the axis of the rotation shaft section 3, and a restraining end section 32 which is formed by cutting away to be an L-shaped cross-section from an end edge of the escape recess section 32A.

That is; the head section 31 includes the restraining end section 32 at which a portion of the outer peripheral surface portion 31A is cut away to form a step.

As will be described later, the escape recess section 32A provided at the head section 31 is utilized as an escape section for the small head section 49, and the restraining end section 32 provided at the head section 31 is utilized as a restraining section for the small head section 49. Therefore, the escape recess section 32A is not limited in planar shaped cross-section and may be formed in a shape such as a recessed portion or the like.

The first lock plate 33 is attached to a portion protruding from a distal end of the head section 31. The first lock plate 33 is provided with the lock protrusion section 35 protruding from a portion of an oval outer periphery portion thereof. At this first lock plate 33, a distal end section which protrudes from the second rotation movement range limiting head section 31 of the movement limiting rotation shaft member 12 is inserted into an oval opening portion that is opened at a middle portion of the first lock plate 33.

At the movement limiting rotation shaft member 12 that is structured thus, the first lock plate 33 is attached to the distal end portion of the movement limiting rotation shaft member 12, the first sliding plate 13 is abutted against a side surface of the head section 31 through the shaft member portion of the movement limiting rotation shaft member 12, and the movement limiting rotation shaft member 12 is inserted into the shaft hole of the rotation shaft holding section 4. Here, the head section 31 is positioned at the opening portion 9.

In this state, the second sliding plate 15, which is fabricated of stainless steel, is slidably fitted onto the shaft member portion of the movement limiting rotation shaft member 12 that protrudes from the rotation shaft holding section 4 of the hinge housing 1.

Subsequent to the second sliding plate 15, the first compression coil spring 16 is fitted onto the shaft member portion of the movement limiting rotation shaft member 12 that protrudes from the rotation shaft holding section 4 of the hinge housing 1. Further, serving as two sets of movement limiting means, the first fixed cam 17, the first rotating cam 18 and the first fixed plate 19 are fitted onto the shaft member portion to be slidable relative to each other.

A shaft hole 38 is formed in the first fixed cam 17. The oval cross-section shaft member of the movement limiting rotation shaft member 12 is slidably but not rotatably inserted into the shaft hole 38.

A shaft hole 39 is formed in the first rotating cam 18. The oval cross-section shaft member of the movement limiting rotation shaft member 12 is rotatably inserted into the shaft hole 39. Attachment protrusion pieces 40 are provided protruding from the first rotating cam 18, the attachment protrusion pieces 40 each protruding from the outer periphery toward the radial direction.

Further, a shaft hole 41 is formed in the first fixed plate 19. The oval cross-section shaft member of the movement limiting rotation shaft member 12 is slidably but not rotatably inserted into the shaft hole 41.

In order to constitute the two sets of movement limiting means at the rotation shaft section 3, the first fixed cam 17, subsequent to the first compression coil spring 16, is fitted onto the shaft member portion of the movement limiting rotation shaft member 12 that protrudes from the rotation shaft holding section 4 of the hinge housing 1, so as to rotate integrally with the movement limiting rotation shaft member 12.

At the first rotating cam 18, the shaft member portion of the movement limiting rotation shaft member 12 is inserted into the shaft hole 39, and the two attachment protrusion pieces 40 are fitted into respective restraining recess sections 42, which are provided at the shaft hole opening portion of the rotation shaft holding section 4, and disposed so as not to rotate with respect to the rotation shaft holding section 4.

At the first fixed plate 19, the shaft member portion of the movement limiting rotation shaft member 12 is inserted into the oval penetrating hole 41, and the first fixed plate 19 rotates integrally with the rotation shaft section 3.

At the sliding surfaces of the first fixed cam 17 and the first rotating cam 18, cam surfaces (protruding and recessed portions) that respectively protrude in the rotation shaft direction are formed, and structured such that at the formed cam surfaces, an operation of fit-and-restrain of the respective cam surfaces (protruding and recessed portions) is implemented when the first fixed cam 17 and the first rotating cam 18 have relatively rotated by 170°.

Further, at the sliding surfaces of the first rotating cam 18 and the first fixed plate 19, cam surfaces (protruding and recessed portions) that respectively protrude with respect to the rotation shaft direction are formed. A click operation for the cam surfaces (protruding and recessed portions) to be fit and restrained for temporal tacking each other is carried out when the first rotating cam 18 and the first fixed plate 19 have relatively rotated by 135° at cam surfaces.

As a result of the two sets of movement limiting means being constituted at the rotation shaft section 3 in this manner, when the hinge housing 1 and the movement limiting rotation shaft member 12 start to relatively rotate from a predetermined reference position of the closed state and are rotated by 135°, they are temporarily tacked and temporarily restrained. Then, when they are relatively rotated further and have been rotated by 170°, they reach a predetermined open state and are restrained. When switching from the open state to the closed state, operations the opposite to those described above are implemented.

The first holder member 20, subsequent to the first fixed plate 19, is attached to the shaft member portion of the movement limiting rotation shaft member 12 that protrudes from the rotation shaft holding section 4. A penetration hole 43 is formed in this first holder member 20. A free end portion of the oval cross-section shaft member of the movement limiting rotation shaft member 12 is inserted into the penetration hole 43.

The shaft member distal end portion of the movement limiting rotation shaft member 12 is inserted into the penetration hole 43 of the first holder member 20 while the first compression coil spring 16 is being compressed, and having been inserted to a predetermined position, the shaft member distal end portion is fixed by crimping (rivet-fastening) or the like.

This first holder member 20 is attached to either one of two housings (a housing 62 at which push buttons are arranged and a housing 63 at which an LCD monitor is arranged) that constitute a small electronic apparatus or the like (here, a portable telephone device) and fold in two (see FIG. 2).

In the rotation shaft section 3 that is constituted thus, the rotation limiting protrusion section 31 of the movement limiting rotation shaft member 12 press-contacts against a sliding support surface (not illustrated) provided inside the shaft hole of the hinge housing 1, via the first sliding plate 13, by urging force of the first compression coil spring 16. Therefore, the state of attachment of the movement limiting rotation shaft member 12 to the hinge housing 1 may be properly retained.

In addition, in the rotation shaft section 3, the state in which the cam surfaces of the first fixed cam 17 and the first rotating cam 18 press-contact may be maintained by the urging force of the first compression coil spring 16. Therefore, the operation of fitting and restraining the cam surfaces (protruding and recessed portions) is implemented reliably.

Moreover, the state in which the cam surfaces of the first rotating cam 18 and the first fixed plate 19 press-contact may be maintained. Therefore, the click operation fitting the cam surfaces (protruding and recessed portions) and restraining such that the cam surfaces are temporarily tacked is implemented reliably Further, in the rotation shaft section 3 that is constituted thus, the movement limiting rotation shaft member 12 is restrained at a position that is rotated by 170°, from the reference position of the closed state, which is a predetermined position of an open state, by the first fixed cam 17 and the first rotating cam 18.

Furthermore, a constitution is formed in which, when opening is performed beyond the position of the predetermined open state, the lock protrusion section 35 provided at the first lock plate 33 which is disposed on the movement limiting rotation shaft member 12 touches against the two restraining surfaces 10 provided at the hinge housing 1 and is restrained, and a rotation movement of the movement limiting rotation shaft member 12 beyond the predetermined open state is limited.

Further, a rotation movement of the attachment protrusion pieces 40 provided at the outer periphery of the first rotation cam for rotation movement range limiting of the first holder member 20 is limited by the two restraining recess sections 42 of the rotation shaft holding section 4.

With these actions, even if a larger rotating load is applied on the movement limiting rotation shaft member 12, the movement limiting rotation shaft member 12 may reliably be prevented from rotating excessively.

As shown in FIG. 10, at the movement limiting opening and closing shaft member 21 of the opening and closing shaft section 2, which structures a rotation system for the opening and closing shaft installed at the opening and closing shaft holding section 5 of the hinge housing 1, the first rotation movement range limiting small head section 49 is integrally formed at a distal end portion of an oval cross-section shaft member.

The small head section 49 includes a first limiting outer peripheral surface portion 49A formed in a circular rod shape, and a restraining end surface 50 which is formed by a portion of an outer periphery portion of the outer peripheral surface portion 49A being cut by a plane parallel to the axis line of the opening and closing shaft section 2.

That is, the small head section 49 is formed with a letter D shape in a cross-sectional view, and a length of the small head section 49 in the shaft direction of the opening and closing shaft section 2 is formed to be approximately half of the length of the head section 31 in the shaft direction of the rotation shaft section 3, therefore, a reduction in size is carried out.

The second lock plate 34 is attached at a shaft section 21E that protrudes from a side surface of the small head section 49 provided on the movement limiting opening and closing shaft member 21.

At the second lock plate 34, a lock protrusion section 51, which is a protrusion section for locking, is provided protruding from a portion of an outer peripheral portion formed in an oval shape. At this second lock plate 34, the shaft section 21E protruding from the small head section 49 is inserted and fixed at an oval opening portion formed in a middle portion of the second lock plate 34.

Penetration holes 52 for fixing are formed in an end portion of the movement limiting opening and closing shaft member 21 at the opposite side thereof from the first rotation movement range limiting small head section 49.

The third sliding plate 22 is fitted onto a shaft member portion of the movement limiting opening and closing shaft member 21, and the third sliding plate 22 is inserted into the shaft hole of the opening and closing shaft holding section 5 in a state in which the third sliding plate 22 is abutted against an end surface 48 of the small head section 49. Here, the small head section 49 is positioned at the opening portion 9.

In this state, the fourth sliding plate 24, which is fabricated of stainless steel, is fitted onto the shaft member portion of the movement limiting opening and closing shaft member 21 protruding from the recess section 111, so abutted against the sliding support surface section 8 inside the shaft hole of the hinge housing 1.

Subsequent to the fourth sliding plate 24, the second compression coil spring 25 is fitted onto the shaft member portion of the movement limiting opening and closing shaft member 21 protruding from the opening and closing shaft holding section 5 of the hinge housing 1, and then the second fixed cam 26 and the second rotating cam 27, which serve as movement limiting means, are inserted such that adjacent side surfaces thereof slide against each other.

A shaft hole 53 is formed in the second fixed cam 26. The oval cross-section shaft member of the movement limiting opening and closing shaft member 21 is inserted into the shaft hole 53 to slide freely in the shaft direction but be not rotatable.

A shaft hole 54 is formed in the second rotating cam 27. The oval cross-section shaft member of the movement limiting opening and closing shaft member 21 is rotatably inserted into the shaft hole 54. Attachment protrusion pieces 55 are provided at the second rotating cam 27. The attachment protrusion pieces 55 protrude from the outer periphery along the radial direction.

In order to constitute the movement limiting means, at the opening and closing shaft section 2, the second fixed cam 26, subsequent to the second compression coil spring 25, is fitted onto the shaft member portion of the movement limiting opening and closing shaft member 21 that protrudes from the opening and closing shaft holding section 5 of the hinge housing 1, so as to rotate integrally with the movement limiting opening and closing shaft member 21.

At the second rotating cam 27, the shaft member portion of the movement limiting opening and closing shaft member 21 is inserted into the shaft hole 54, and the two attachment protrusion pieces 55 provided at the outer periphery of the second rotating cam 27 are fitted to two engaging recess sections 56, which are provided at the shaft hole opening portion of the opening and closing shaft holding section 5. Thus, rotation of the second rotating cam 27 is limited by the opening and closing shaft holding section 5.

At the sliding surfaces of the second fixed cam 26 and the second rotating cam 27, cam surfaces (protruding and recessed portions) that protrude with respect to the rotation shaft direction are formed. When the second fixed cam 26 and the second rotating cam 27 have relatively rotated by 160°, the cam surfaces (protruding and recessed portions) fit and rotation is restrained.

Because of the movement limiting means being provided at the opening and closing shaft section 2 in this manner, when the opening and closing shaft holding section 5 and the movement limiting opening and closing shaft member 21 start to relatively rotate and are rotated by 160° from the predetermined reference position of the closed state, it becomes the predetermined open state and the rotation is restrained. When switching from the open state to the closed state, an operation the opposite to that described above is implemented.

Subsequent to the second rotating cam 27 constituting the movement limiting means, the second fixed plate 28, which includes an oval opening portion, is fitted onto the shaft member portion of the movement limiting opening and closing shaft member 21 that protrudes from the opening and closing shaft holding section 5 of the hinge housing 1, and then the second holder member 29 is attached.

A hollow section 57 is formed in the second holder member 29. A free end portion of the oval cross-section shaft member of the movement limiting opening and closing shaft member 21 is inserted into the hollow section 57.

Fixing pin penetration holes 59, for fixing with fixing pins 60, which are in communication with the fixing penetration holes 52 of the movement limiting opening and closing shaft member 21, are formed at corresponding positions of the second holder member 29.

Accordingly, at the second holder member 29, the shaft member distal end portion of the movement limiting opening and closing shaft member 21 is inserted into the hollow section 57 while the second compression coil spring 25 is being compressed in the shaft direction of the opening and closing shaft section 2, and the fixing penetration holes 52 of the movement limiting opening and closing shaft member 21 are matched up with the fixing pin penetration holes 59, and the movement limiting opening and closing shaft member 21 is fixed with the fixing pins 60.

The second holder member 29 is attached to either one of the two housings (the housing 62 at which the push buttons are arranged and the housing 63 at which the LCD monitor is arranged) that constitute the small electronic apparatus or the like (here, the portable telephone device) and fold in two (see FIG. 2).

For example, if the second holder member 29 is attached to the housing 63 at which the LCD monitor is arranged, the second holder member 29 of which the cross-sectional profile is oval is inserted into a fitting hole 61A of an attachment member 61 at the housing 63 side of the portable telephone device, and is fixed using the above-mentioned fixing pins 60.

Thus, the second holder member 29 may be attached to the portable telephone device housing 63.

Herein, this attachment member 61 is not to be limited to the illustrated shape. The attachment member 61 may be structured by plural separate components, and retain corresponding locations of the movement limiting opening and closing shaft member 21.

In the opening and closing shaft section 2, the sliding seat section 48 formed at a side surface of the small head section 49 is press-contacted against the sliding support surface section 8 provided inside the shaft hole of the hinge housing 1 via the third sliding plate 22, by urging force of the second compression coil spring 25. Therefore, the state of attachment of the movement limiting opening and closing shaft member 21 with respect to the hinge housing 1 may be properly retained.

Furthermore, in the opening and closing shaft section 2, the state in which the cam surfaces (protruding and recessed portions) of the second fixed cam 26 and the second rotating cam 27 are press-contacted together may be maintained by the urging force of the second compression coil spring 25. Therefore, an operation of fitting and restraining the cam surfaces (protruding and recessed portions) is implemented reliably.

Thus, in the opening and closing shaft section 2, when the movement limiting opening and closing shaft member 21 has rotated by 160° from the predetermined reference position of the closed state, further rotation is restrained by the second fixed cam 26 and the second rotating cam 27.

Furthermore, the lock protrusion section 51 provided protruding from the outer periphery of the second lock plate 34 touches against the restraining surface 6 of the hinge housing 1, and rotation movement of the opening and closing shaft section 2 is limited.

Further, rotation movement of the protrusion pieces 55, which are provided for rotation movement range limiting of the second holder member 29, is limited by restraint at the two restraining surfaces 7 of the hinge housing 1.

Therefore, even if a large rotating load is applied to the movement limiting opening and closing shaft member 21, the movement limiting opening and closing shaft member 21 may reliably be prevented from rotating excessively.

In this hinge mechanism, the second rotation movement range limiting head section 31 of the rotation shaft section 3 and the small head section 49 installed at the hinge housing 1 oppose one another through the opening portion 9 to be capable of direct contact, as shown in FIG. 5 to FIG. 8.

As mentioned above, the length in the shaft direction of the opening and closing shaft section of the small head section 49 is formed to be approximately half of the length in the shaft direction of the rotation shaft section of the second rotation movement range limiting head section 31, and a maximum diameter of the small head section 49 is formed to be substantially equal to a maximum diameter of the head section 31.

The distance between the axis of the rotation shaft of the opening and closing shaft section 2 and the axis of the rotation shaft of the rotation shaft section 3 is set to a value smaller than a distance in which the radius of the second limiting outer peripheral surface portion 31A is added to the radius of the first limiting outer peripheral surface portion 49A.

In addition, the distance between the axis of the rotation shaft of the opening and closing shaft section 2 and the axis of the rotation shaft of the rotation shaft section 3 is set to a value equal to or more than a distance in which a distance from the rotation shaft of the opening and closing shaft section 2 to the restraining end surface 50 is added to the radius of the second limiting outer peripheral surface portion 31A, and further a value equal to or more than a distance in which a distance of the restraining end section 32 in the radial direction with respect to the rotation shaft is subtracted from the distance in which the radius of the second limiting outer peripheral surface portion 31A is added to the radius of the first limiting outer peripheral surface portion 49A.

Now, in this hinge mechanism, when the one housing 62 and the other housing 63 of the portable telephone are closed and the opening and closing shaft section 2 and the rotation shaft section 3 are at the predetermined reference positions of the closed state, as shown in FIG. 6, a state is set in which the restraining end surface 50 of the opening and closing shaft section 2 faces the escape recess section 32A of the rotation shaft section 3, and the restraining end section 32 moves away from the restraining end surface 50 to the distal end side.

In the state shown in FIG. 6, in which the hinge mechanism is at the closed state reference position, the first rotation movement range limiting small head section 49 of the opening and closing shaft section 2 opposes the escape recess section 32A of the rotation shaft section 3, and the opening and closing shaft section 2 is in a free rotatable state.

Furthermore, the second rotation movement range limiting head section 31 of the rotation shaft section 3 opposes the restraining end surface 50 of the opening and closing shaft section 2, and the rotation shaft section 3 is in a free rotatable state.

That is, in the state shown in FIG. 1, FIG. 5 and FIG. 6, in which the hinge mechanism is at the closed state reference position, the opening and closing shaft section 2 and the rotation shaft section 3 are both in rotatable states with respect to the hinge housing 1.

Therefore, with the double-folding type portable telephone device in which the two housings 62 and 63 are connected using this hinge mechanism, from the closed state shown in FIG. 2, either of the "longitudinal direction open state" shown in FIG. 3 and the "lateral direction open state" shown in FIG. 4 may be arbitrarily selected.

With the double-folding type portable telephone device equipped with this hinge mechanism, when an opening operation from the closed state shown in FIG. 2 to the longitudinal direction open state shown in FIG. 3 is to be carried out, a user holds the one housing 62 (for example, the housing at which the push buttons are arranged) and manipulates to lift up the other housing 63 (for example, the housing at which the LCD monitor is arranged), and thus may open the one housing 62 and the other housing 63 around the opening and closing shaft section 2 of the hinge mechanism to the longitudinal direction open state.

In this operation, from the closed state of the hinge mechanism shown in FIG. 2 and FIG. 6, by the opening and closing shaft section 2 being rotated, the first rotation movement range limiting small head section 49 rotates as shown in FIG. 7 and the first limiting outer peripheral surface portion 49A enters into the region of the escape recess section 32A at the second rotation movement range limiting head section 31 of the rotation shaft section 3.

In this state, because the first limiting outer peripheral surface portion 49A that has entered the escape recess section 32A is a circular arc, the opening and closing shaft section 2 is freely rotatable.

The opening and closing shaft section 2 may open to the longitudinal direction through a range until it is rotated 160° and is restrained by the second fixed cam 26 and second rotating cam 27 that serve as the movement limiting means. Here, in order not to occur that the opening and closing shaft section 2 is out of the rotation range between the open state and the closed state and rotates excessively, the lock protrusion section 51 of the second lock plate 34 touches against the restraining surface 6 and is restrained, and the attachment protrusion pieces 55 of the second holder member 29 touch against the restraining surfaces 7 and are restrained.

In the state in which the housing 62 and the housing 63 have been opened in the longitudinal direction, if the rotation shaft section 3 acts to rotate so as to open to the lateral direction open state, the restraining end section 32 touches against a distal end surface 49B of the small head section 49 of the opening and closing shaft section 2 in a state of linear contact, and dispersing the load. Thus, rotation is restrained in a stable state.

Furthermore, because the direction in which the restraining end section 32 touches against the distal end surface 49B of the first rotation movement range limiting small head section 49 of the opening and closing shaft section 2 is the direction of the rotation shaft of the movement limiting opening and closing shaft member 21, the force with which the restraining end section 32 presses against the first rotation movement range limiting small head section 49 is supported by the sliding support surface section 8. Therefore, the movement limiting opening and closing shaft member 21 will not be deformed.

That is, when the restraining end section 32 touches against the end surface of the small head section 49 in the linear contact state, compared to a case of touching with point contact, a concentration of stress is avoided and damage to the contact portion may be prevented. In addition, by causing touching with line contact, a probability of an error in the restraint position occurring may be reduced from a probability of an error in the restraint position occurring with point contact, due to an error in a machined shape such as there being an indentation at a location of touching or the like, by errors in the machined shape, such as there being an indentation or the like being averaged.

Note, in a case of a constitution such that the first rotation movement range limiting small head section 49 of the movement limiting opening and closing shaft member 21 pushes in a direction perpendicular to the rotation shaft in order to restrain rotation of the rotation shaft section 3, the movement limiting opening and closing shaft member 21 would be deformed so as to bend with respect to the rotation shaft. Therefore, in order to prevent this, stiffness of the hinge housing 1 must be raised and machining accuracy of bearing holes must be raised, and the hinge housing 1 would have a higher cost.

Furthermore, in this portable telephone device, if a load is applied such that the rotation shaft section 3 acts to rotate to the opposite side from opening to the open state in the lateral direction, the escape recess section 32A touches against the first limiting outer peripheral surface portion 49A and the rotation is restrained.

With this portable telephone, when returning from the longitudinal direction open state to the closed state, an operation the opposite to the operation described above is carried out.

Next, a case of opening the portable telephone device from the closed state to the lateral direction open state will be described.

When opening to the lateral direction open state, a user holds the one housing 62 (for example, the housing at which the push buttons are arranged) and manipulates to spread the other housing 63 (for example, the housing at which the LCD monitor is arranged) in the lateral direction, and thus may open the one housing 62 and the other housing 63 around the rotation shaft section 3 of the hinge mechanism to the lateral direction open state.

In this operation, from the closed state of the hinge mechanism shown in FIG. 2 and FIG. 6, by the rotation shaft section 3 being rotated, the second rotation movement range limiting head section 31 rotates as shown in FIG. 8 and the second limiting outer peripheral surface portion 31A enters into the recess portion of the first rotation movement range limiting small head section 49 of the opening and closing shaft section 2, at which the restraining end surface 50 is formed.

In this state, because the second limiting outer peripheral surface portion 31A that has entered the recess portion at which the restraining end surface 50 is formed is a circular arc, the rotation shaft section 3 is freely rotatable.

Hence, by the actions of the first fixed cam 17, the first rotating cam 18 and the first fixed plate 19 that serve as the two sets of movement limiting means, the rotation shaft section 3 implements the click operation in which, when the one housing 62 and the other housing 63 have been rotated by 135°, the protrusions and recesses of the cam surfaces of the first rotating cam 18 and the first fixed plate 19 fit and temporarily tacked each other and restrained, so the click operation is carried out.

Continuing, at the rotation shaft section 3, the lateral direction rotation of the one housing 62 and the other housing 63 progresses, and when rotated by 170°, the cam surfaces (protruding and recessed portions) of the first fixed cam 17 and the first rotating cam 18 fit one another and restrained in the predetermined lateral direction open state.

Here, such that the rotation shaft section 3 is not out of the rotation range between the open state and the closed state and does not rotate excessively, the lock protrusion section 35 of the first lock plate 33 touches against the restraining surface 10 and is restrained, and the attachment protrusion pieces 40 of the first holder member 20 touch against the restraining surfaces 11 and are restrained.

In the state in which the housing 62 and the housing 63 have been opened to the lateral direction open state, the second limiting outer peripheral surface portion 31A of the second rotation movement range limiting head section 31 that has entered the recess portion at which the restraining end surface 50 is formed is in a state of being contiguous to a vicinity of the restraining end surface 50. Therefore, if the opening and closing shaft section 2 acts to rotate so as to open to the longitudinal direction open state, the restraining end surface 50 touches against the second limiting outer peripheral surface portion 31A of the rotation shaft section 3 and the rotation is restrained.

Here, if a load is applied such that the opening and closing shaft section 2 acts to rotate to the opposite side from opening to the open state in the longitudinal direction, the restraining end surface 50 touches against the second limiting outer peripheral surface portion 31A of the rotation shaft section 3 and the rotation is restrained.

In this hinge mechanism, the length of the small head section 49 in the shaft direction of the opening and closing shaft section 2 is formed to be approximately half of the length in the shaft direction of the head section 31 in the shaft direction of the rotation shaft section 3, and a reduction in size is enabled.

The restraining end surface 50 formed at the small head section 49 abuts against the second limiting outer peripheral surface portion 31A in the direction that is perpendicular to the rotation shaft of the opening and closing shaft section 2 and limits rotation.

Therefore, even if the width of the restraining end surface 50 in the rotation shaft direction of the opening and closing shaft section 2 is formed to be shorter in order to reduce the size of the small head section 49, the length in the direction perpendicular to the rotation shaft of the opening and closing shaft section 2 is not reduced. Therefore, there is no change in the action of restraining rotation of the opening and closing shaft section 2.

Here, when returning from the lateral direction open state to the closed state, an operation the opposite to the operation described above is carried out.

The constitution of the hinge mechanism described above is a structure in which the shaft that rotates to the longitudinal direction open state is the opening and closing shaft section 2 and the shaft that rotates to the lateral direction open state is the rotation shaft section 3. However, the shaft that rotates to the longitudinal direction open state may be the rotation shaft section 3 and the shaft that rotates to the lateral direction open state may be the opening and closing shaft section 2.

Furthermore, the hinge mechanism installed at this portable telephone device has a structure in which the opening and closing shaft section 2 is formed with the first rotation movement range limiting small head section 49 with the large diameter corresponding to a thickness dimension of the housings 62 and 63 of the portable telephone being formed at a head portion of the movement limiting opening and closing shaft member 21, which is formed as a predetermined narrow shaft member, and the rotation shaft section 3 is formed with the second rotation movement range limiting head section 31 with the large diameter corresponding to a thickness dimension of the housings 62 and 63 of the portable telephone being formed at a head portion of the movement limiting rotation shaft member 12, which is formed as a predetermined narrow shaft member.

Therefore, a structure may be formed in which the interaxial distance between the opening and closing shaft section 2 and the rotation shaft section 3 is arbitrarily set in accordance with a thickness dimension of the housings 62 and 63, in addition to which the movement limiting opening and closing shaft member 21 and the movement limiting rotation shaft member 12 may be structured by narrow shaft members corresponding to required strengths, and a reduction in size may be enabled.

The present invention is not to be limited to the exemplary embodiment described above and it will be clear that numerous other constitutions are possible within a scope not departing from the spirit of the present invention.

EXPLANATION OF REFERENCE NUMERALS

Figure 1:
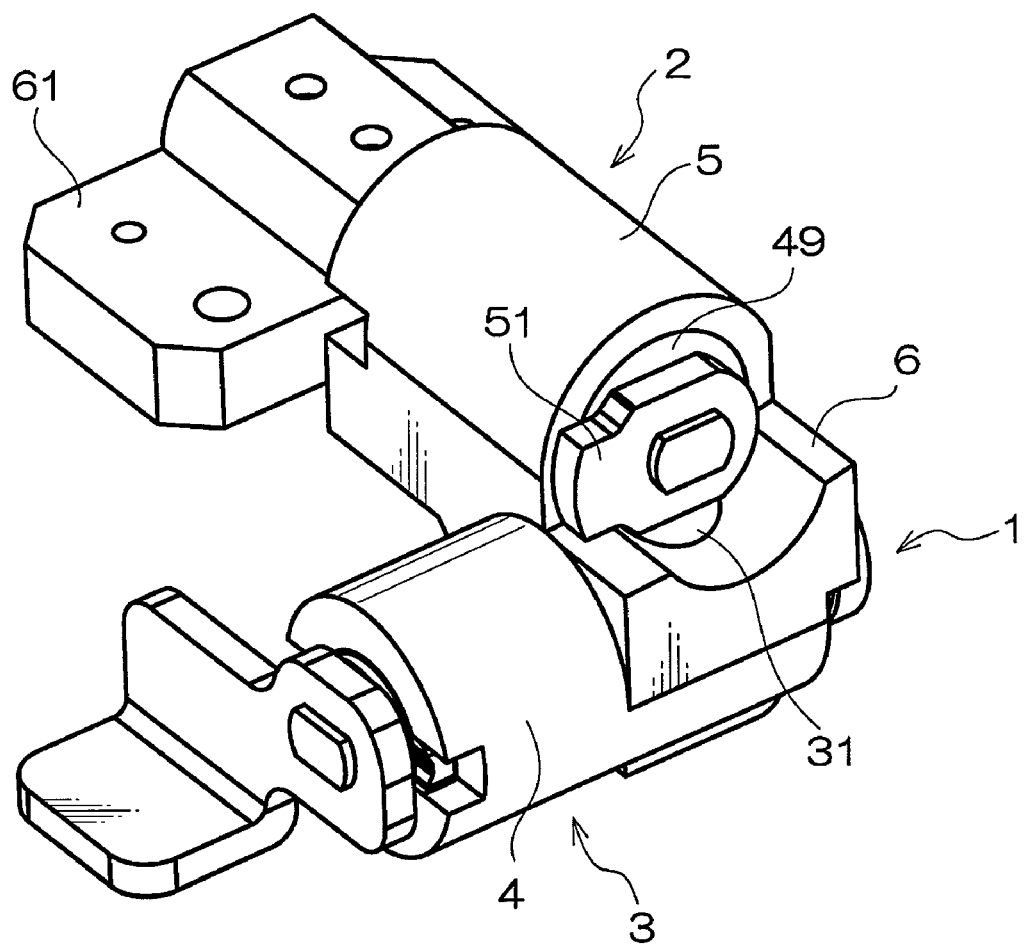
FIG. 1 is a perspective view showing an external view of a hinge mechanism relating to an exemplary embodiment of the present invention.
Figure 2:
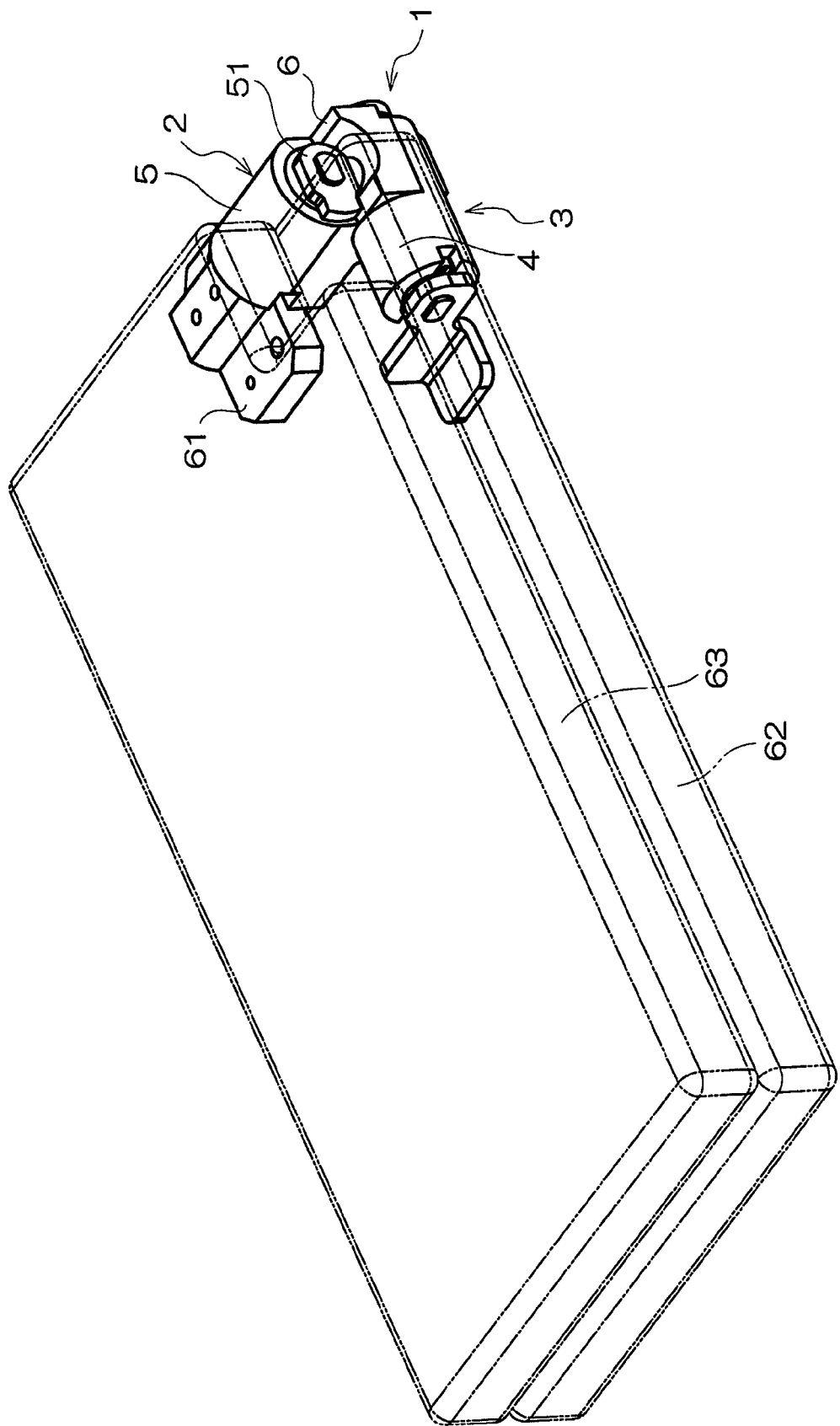
FIG. 2 is a perspective view showing a state in which a double-folding portable telephone device, which is equipped with the hinge mechanism relating to the exemplary embodiment of the present invention, is in a closed state.
Figure 3:
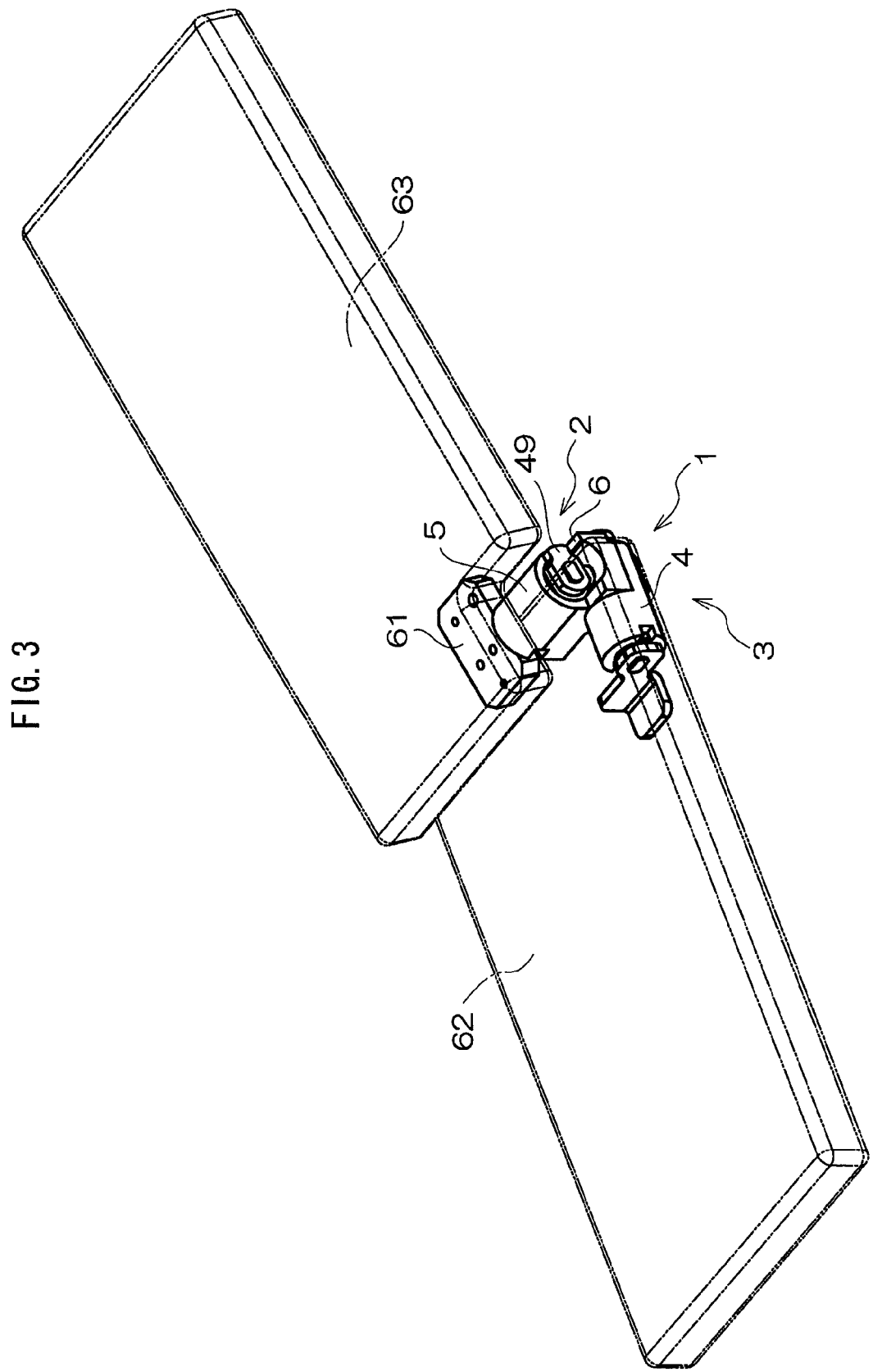
FIG. 3 is a perspective view showing a state in which the double-folding portable telephone device equipped with the hinge mechanism relating to the exemplary embodiment of the present invention is opened in a longitudinal direction.
Figure 4:
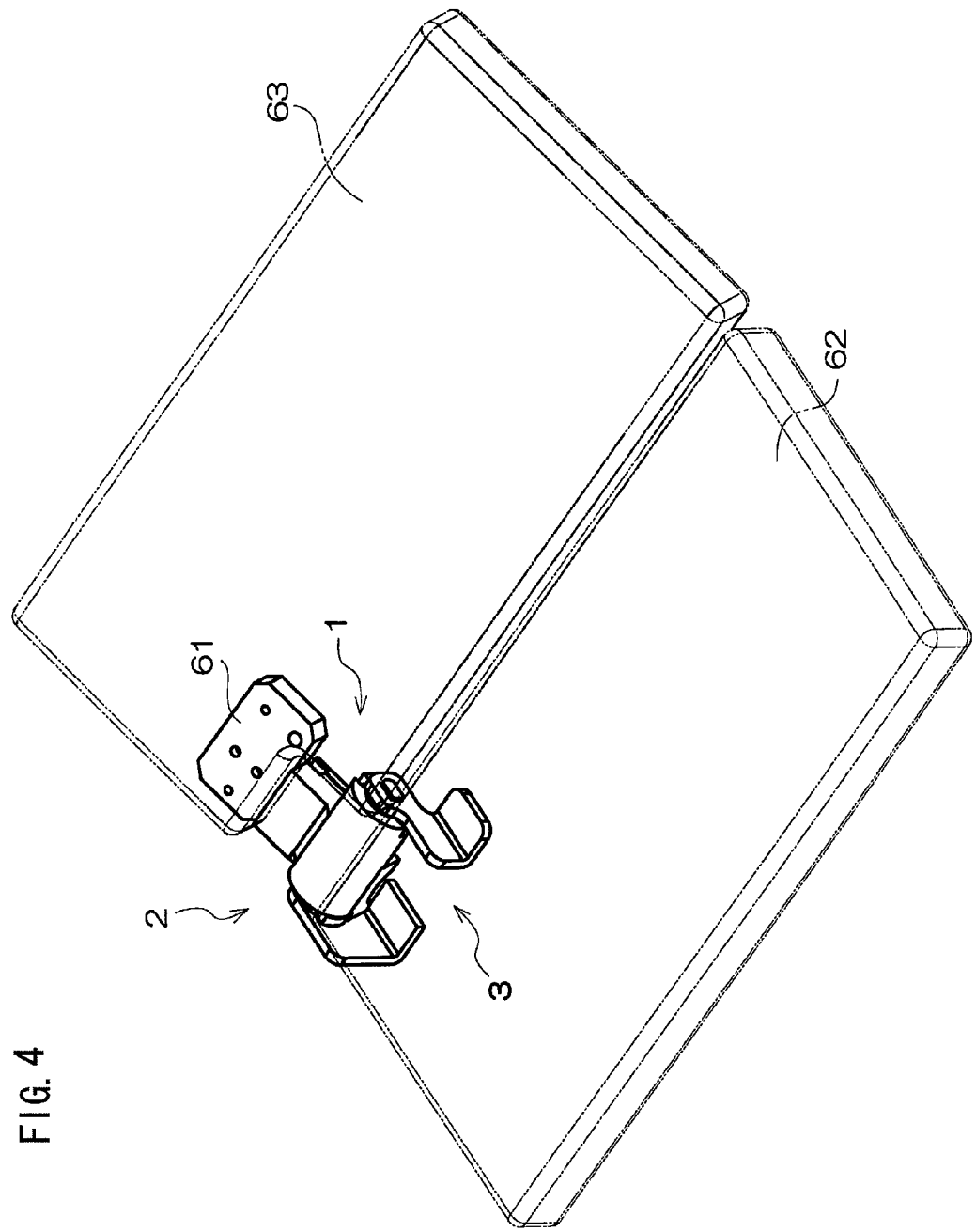
FIG. 4 is a perspective view showing a state in which the double-folding portable telephone device equipped with the hinge mechanism relating to the exemplary embodiment of the present invention is opened in a lateral direction.
Figure 5:
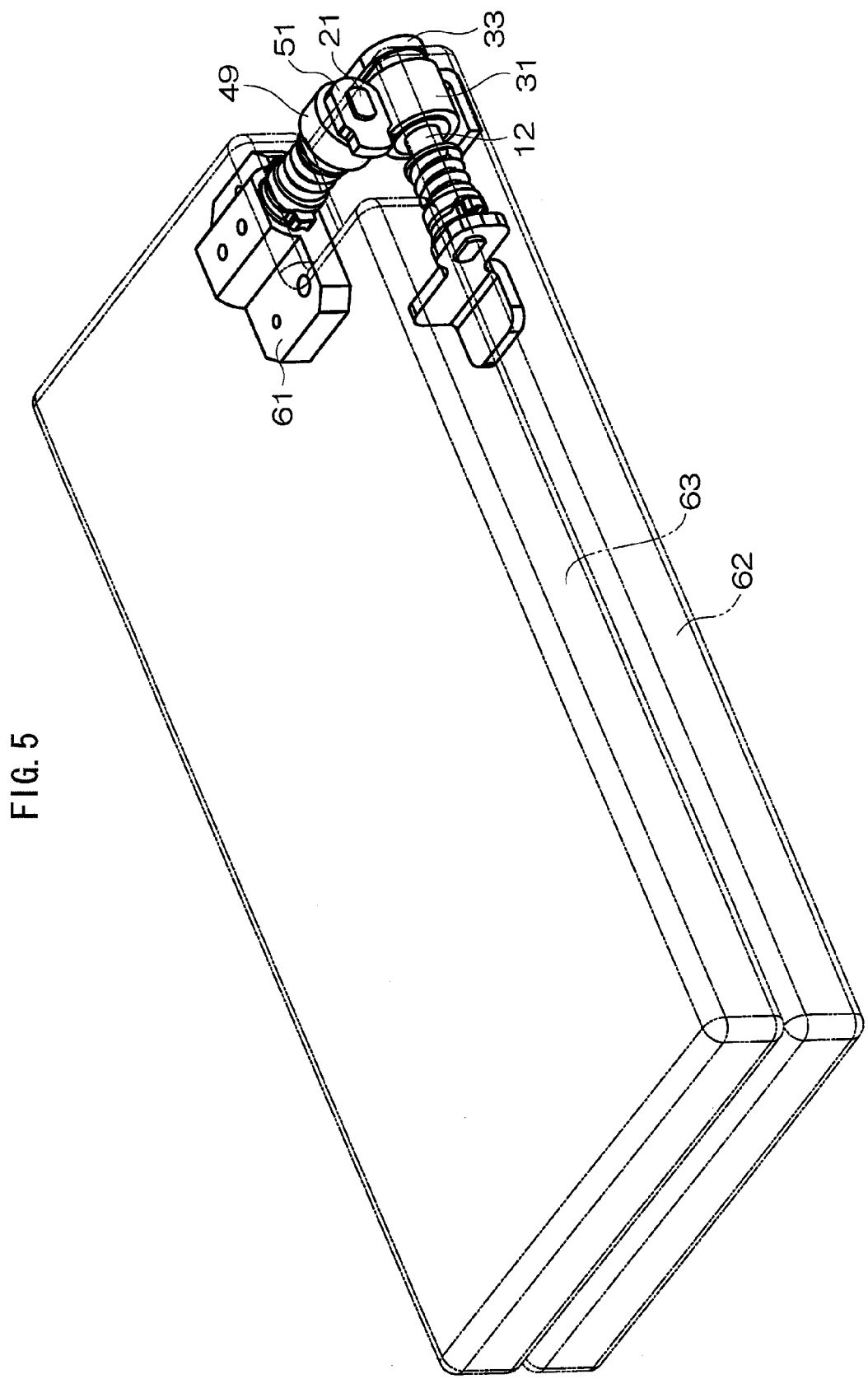
FIG. 5 is a perspective view of principal elements showing an opening and closing shaft section and a rotation shaft section when the hinge mechanism relating to the exemplary embodiment of the present invention is in the closed state.
Figure 6:
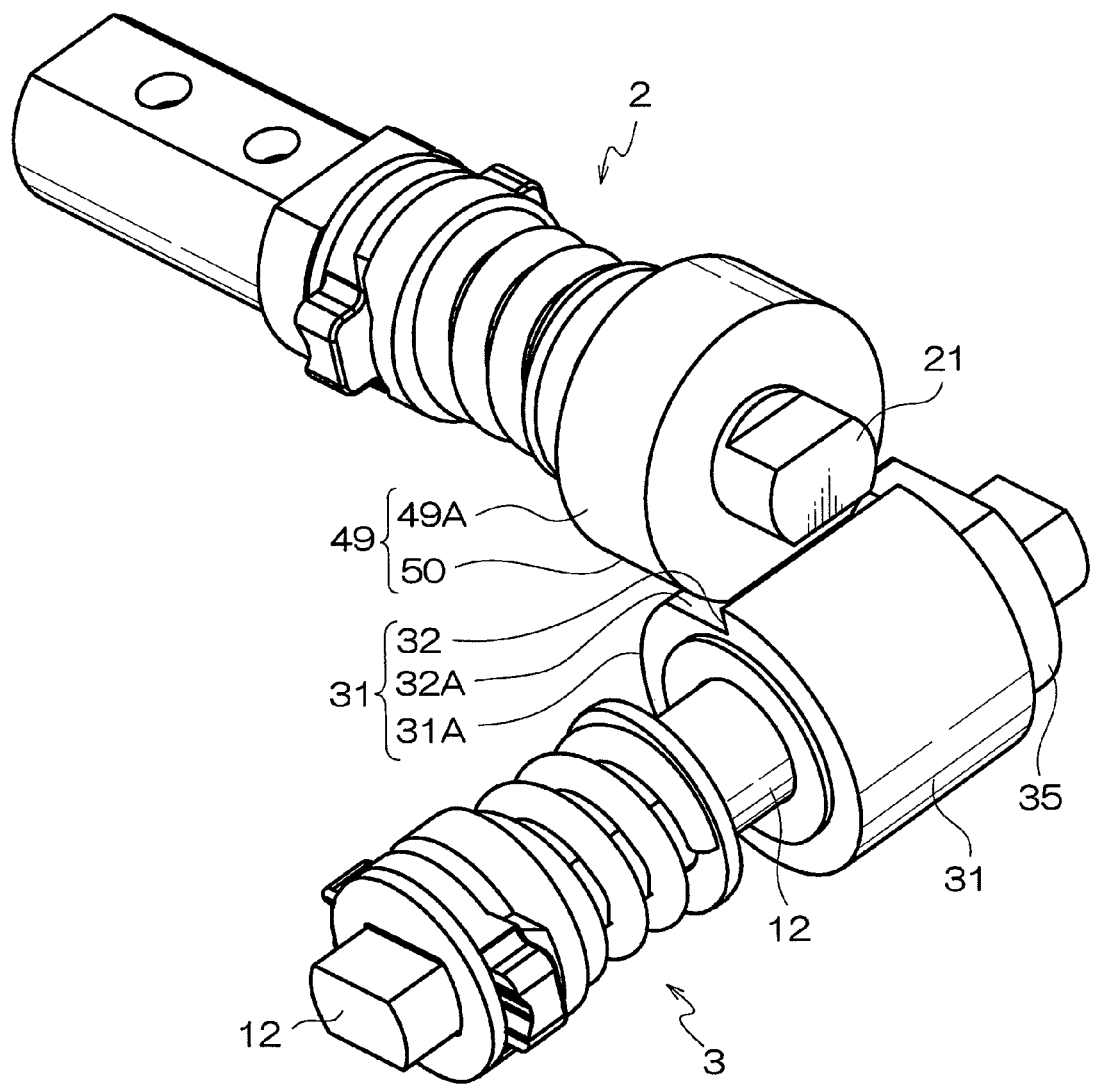
FIG. 6 is an enlarged perspective view of principal elements showing a rotation movement range limiting small head section of the opening and closing shaft section and a rotation movement range limiting head section of the rotation shaft section when the hinge mechanism relating to the exemplary embodiment of the present invention is in the closed state.
Figure 7:
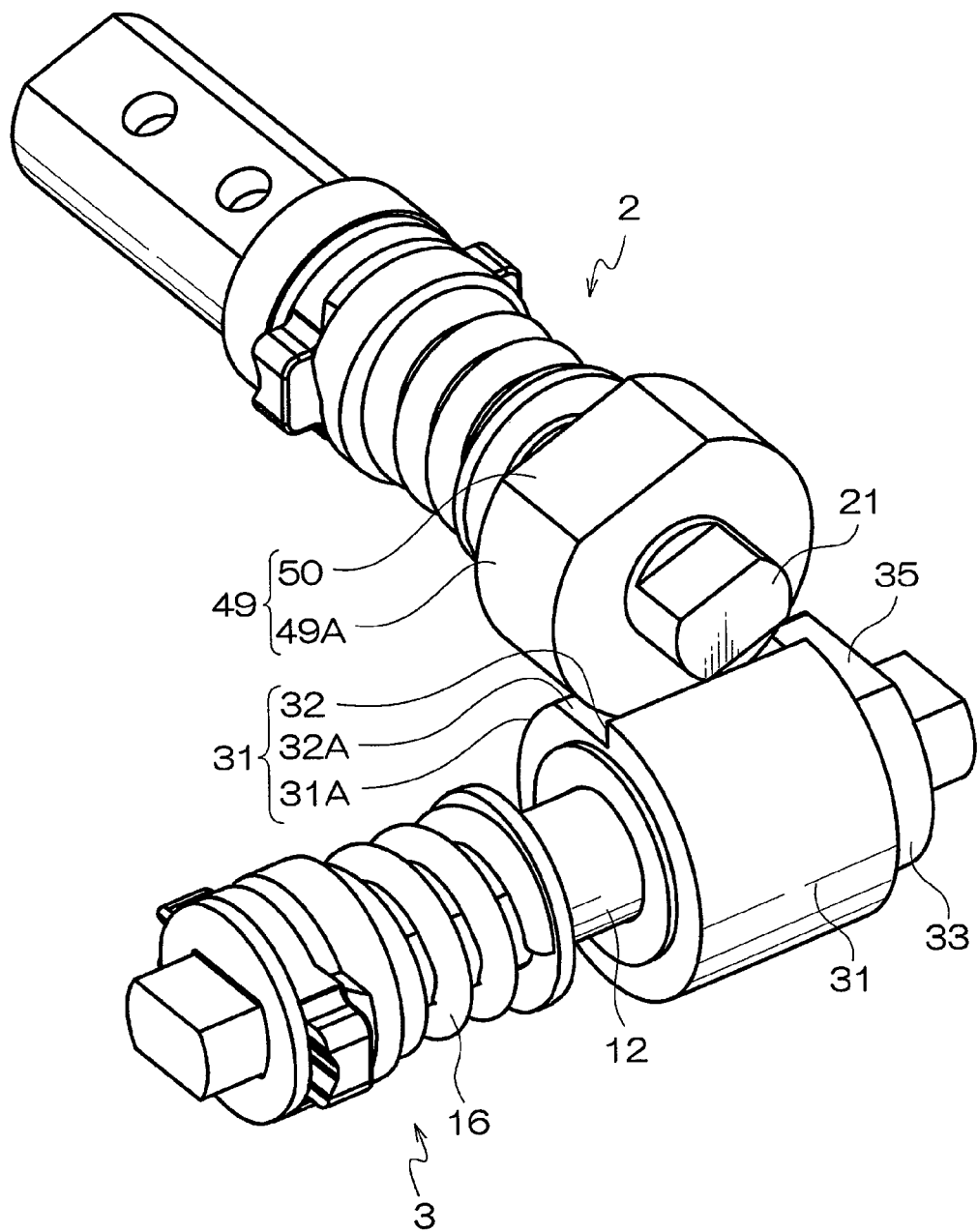
FIG. 7 is an enlarged perspective view of principal elements showing the rotation movement range limiting small head section of the opening and closing shaft section and the rotation movement range limiting head section of the rotation shaft section when the hinge mechanism relating to the exemplary embodiment of the present invention is in the longitudinal direction open state.
Figure 8:
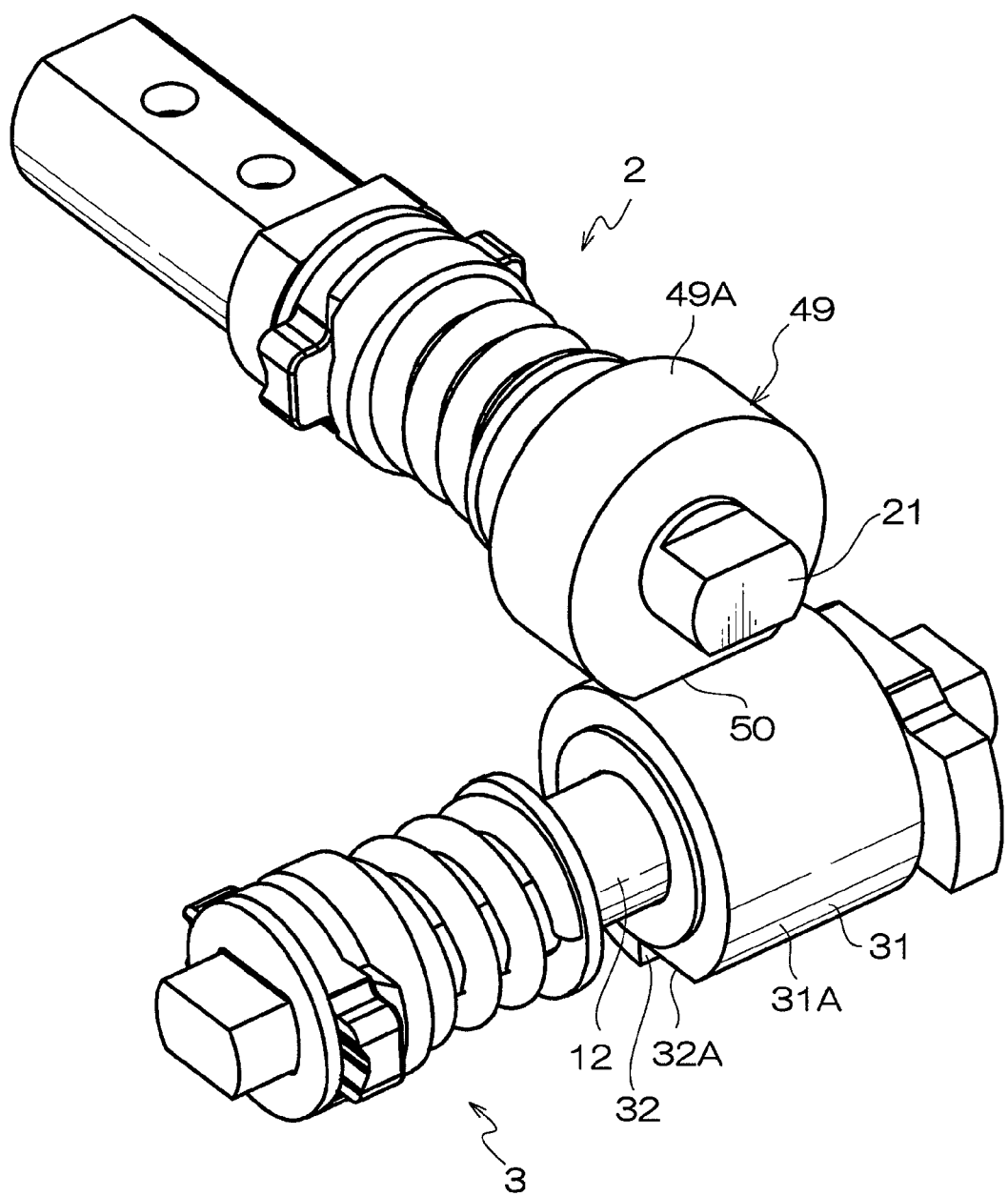
FIG. 8 is an enlarged perspective view of principal elements showing the rotation movement range limiting small head section of the opening and closing shaft section and the rotation movement range limiting head section of the rotation shaft section when the hinge mechanism relating to the exemplary embodiment of the present invention is in the lateral direction open state.
Figure 9:
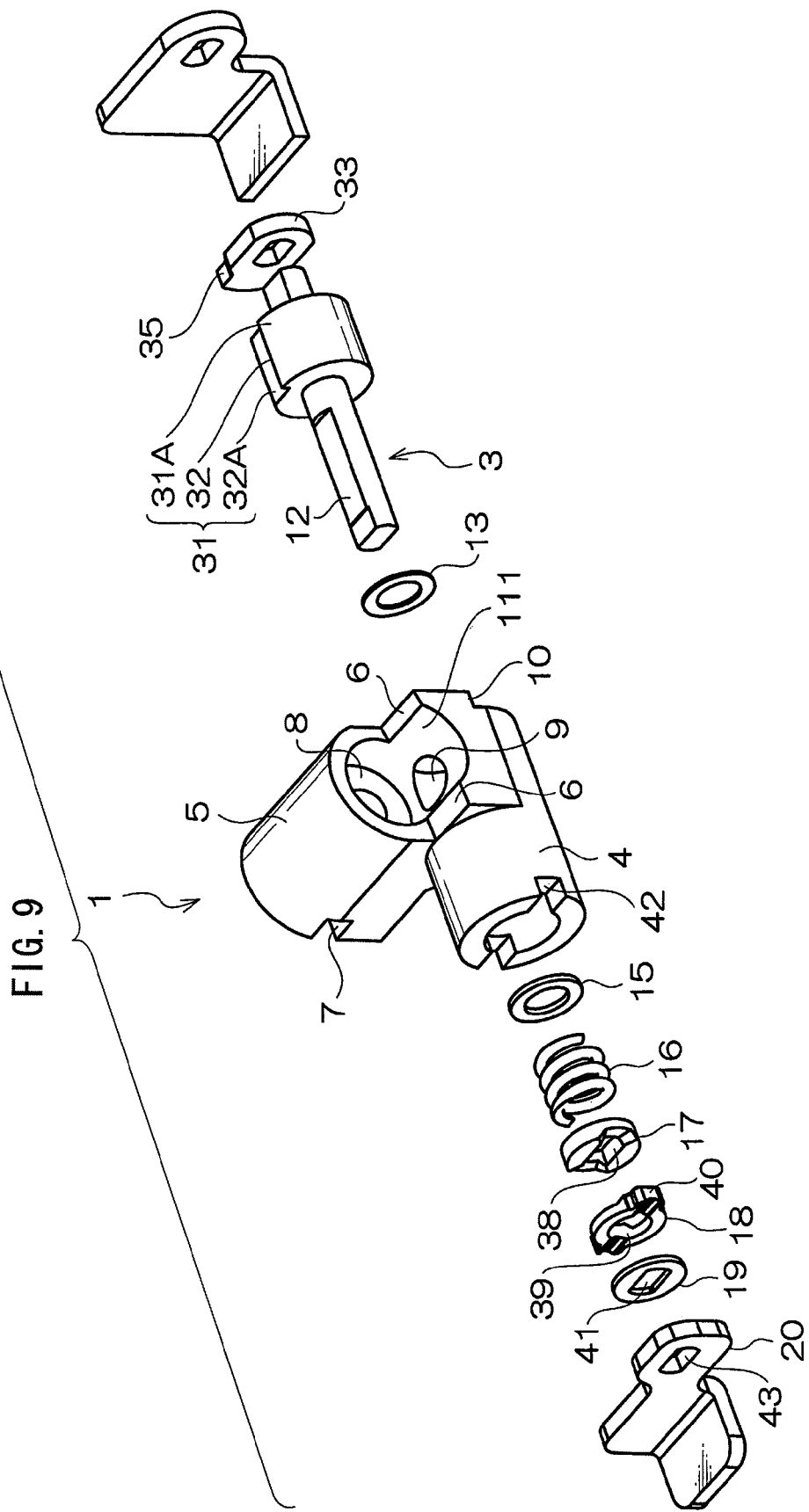
FIG. 9 is an exploded perspective view showing the hinge mechanism relating to the exemplary embodiment of the present invention with the rotation shaft section, which is installed at a hinge housing, extracted.
Figure 10:
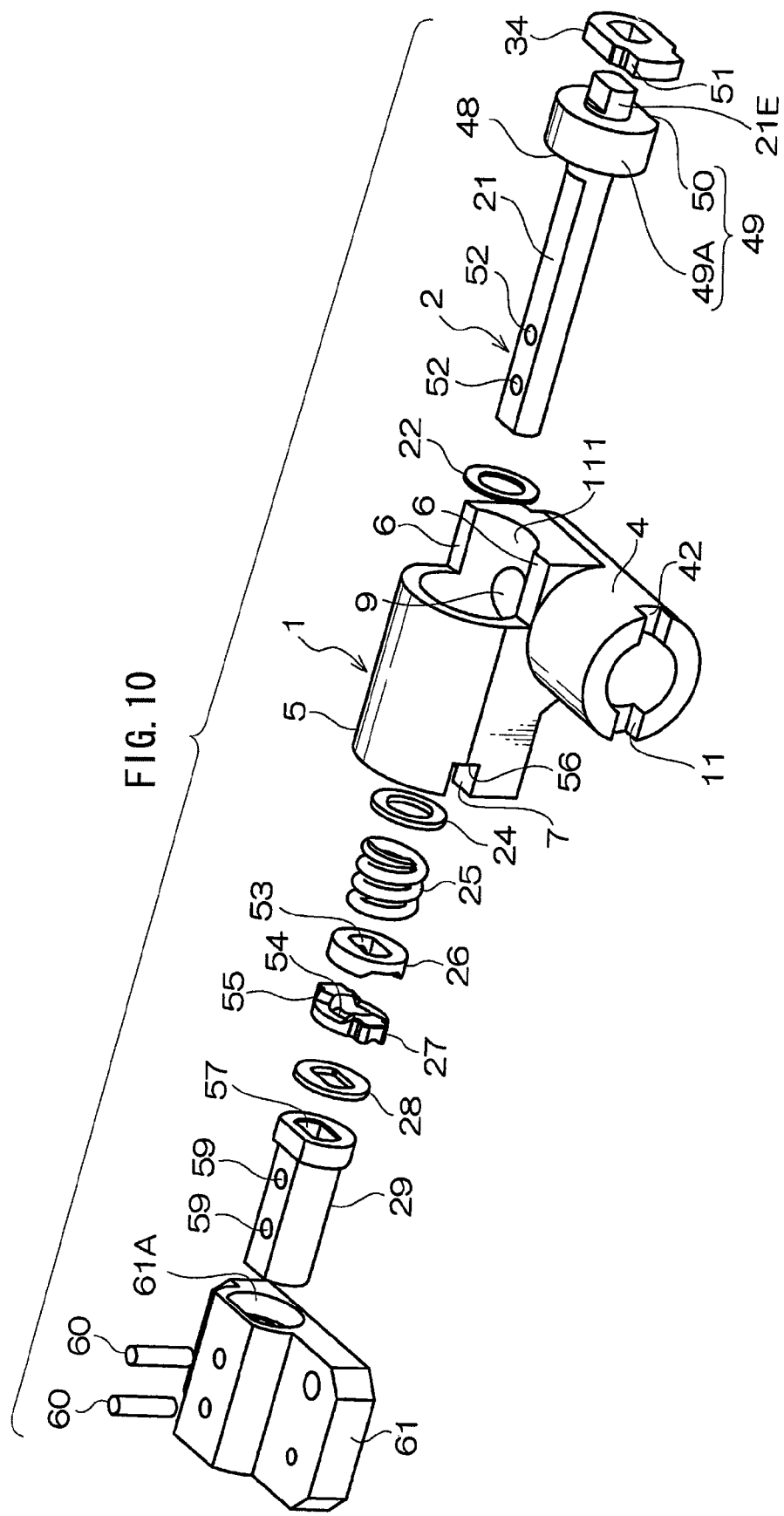
FIG. 10 is an exploded perspective view showing the hinge mechanism relating to the exemplary embodiment of the present invention with the opening and closing shaft section, which is installed at the hinge housing, extracted.

1 Hinge housing
2 Opening and closing shaft section
3 Rotation shaft section
4 Rotation shaft holding section 5 Opening and closing shaft holding section
6 Restraining surface
7 Restraining surface
8 Sliding support surface section
9 Opening portion
10 Restraining surface
11 Restraining surface
12 Movement limiting rotation shaft member
20 First attachment member (holder member)
21 Movement limiting opening and closing shaft member
29 Second attachment member (holder member)
31 Second rotation movement range limiting head section (rotation limiting protrusion section)
31A Second limiting outer peripheral surface (rotation limiting outer peripheral surface)
32 Restraining end section
32A Escape recess section
33 First lock plate
34 Second lock plate
35 Lock protrusion section
44 Lock protrusion section
47 Rotation shaft holding section
49 First rotation movement range limiting small head section (opening and closing limiting protrusion section)
49A First limiting outer peripheral surface (opening and closing limiting outer peripheral surface)
50 Restraining end surface
51 Lock protrusion section
58 Lock protrusion section
61 Attachment member
62 Housing
63 Housing

The invention claimed is:

1. A hinge mechanism comprising:
a movement limiting opening and closing shaft member that is attached to one housing and at an end portion of which an opening and closing limiting protrusion section is provided;
a movement limiting rotation shaft member that is attached to another housing and at an end portion of which a rotation limiting protrusion section is provided;
a hinge housing that is provided with
an opening and closing shaft holding section that rotatably supports the movement limiting opening and closing shaft member, and
a rotation shaft holding section that is arranged perpendicular to the opening and closing shaft holding section, rotatably supports the movement limiting rotation shaft member with being perpendicular to the movement limiting opening and closing shaft member, wherein said rotation shaft holding section allows the rotation limiting protrusion section and the opening and closing limiting protrusion section to accessibly contact each other;
an opening and closing limiting outer peripheral surface portion having a circular arc shape that is formed at the opening and closing limiting protrusion section;
a restraining end surface formed on the opening and closing limiting outer peripheral surface portion, the restraining end surface being a planar surface;
a rotation limiting outer peripheral surface portion having a circular arc shape that is formed at the rotation limiting protrusion section; and
a restraining end section which is a surface formed in an escape recess section located on the rotation limiting outer peripheral surface portion, the escape recess section being configured such that the opening and closing limiting outer peripheral surface portion can be entered in the escape recess section,
wherein, in a state in which the restraining end surface and the restraining end section are opposed, the movement limiting opening and closing shaft member and the movement limiting rotation shaft member are rotatable, and
a spacing between the opening and closing shaft holding section and the rotation shaft holding section is set such that, in a state in which the rotation limiting outer peripheral surface portion opposes the restraining end surface, the restraining end surface touches against the rotation limiting outer peripheral surface portion and rotation of the movement limiting opening and closing shaft member is restrained, and in a state in which the opening and closing limiting outer peripheral surface portion opposes the restraining end section, the restraining end section touches against the opening and closing limiting outer peripheral surface portion and rotation of the movement limiting rotation shaft member is restrained.

2. The hinge mechanism according to claim 1, wherein a length in a shaft direction of the opening and closing limiting protrusion section is set to approximately half of a length in a shaft direction of the rotation limiting protrusion section.

3. The hinge mechanism according to claim 1, comprising:
a lock protrusion section that is provided at the movement limiting opening and closing shaft member; and
a restraining surface that is formed at the opening and closing shaft holding section and that, when the movement limiting opening and closing shaft member is rotated beyond restraint by the restraining end section and the opening and closing limiting outer peripheral surface portion, touches against the lock protrusion section to limit a rotation range of the movement limiting opening and closing shaft member.

4. The hinge mechanism according to claim 1, comprising:
a lock protrusion section that is provided at the movement limiting rotation shaft member; and
a restraining surface that is formed at the rotation shaft holding section and that, when the movement limiting rotation shaft member is rotated beyond restraint by the restraining end surface and the rotation limiting outer peripheral surface portion, touches against the lock protrusion section to limit a rotation range of the movement limiting rotation shaft member.

5. The hinge mechanism according to claim 1, wherein an attachment member that is fixed to the one housing is connected to a holder member that is fixed to the movement limiting opening and closing shaft member.

6. The hinge mechanism according to claim 1, wherein the movement limiting rotation shaft member is connected to an attachment member that is disposed at the other housing.

7. The hinge mechanism according to claim 1, wherein the surface in the escape recess section is a planar surface.

8. The hinge mechanism according to claim 1, wherein the planar surface in the escape recess section forms a step in the rotation limiting outer peripheral surface portion.

9. The hinge mechanism according to claim 1, wherein the planar surface of the opening and closing limiting outer peripheral surface portion is a surface parallel to an axis line of the movement limiting opening and closing shaft member.

* * * * *